United States Patent

[11] 3,612,691

[72] Inventor Jacob Schwartz
 Arlington, Mass.
[21] Appl. No. 797,563
[22] Filed Feb. 7, 1969
[45] Patented Oct. 12, 1971
[73] Assignee Sanders Associates, Inc.
 Nashua, N.H.

[54] MONOCHROMATICITY DETECTOR
 15 Claims, 5 Drawing Figs.
[52] U.S. Cl. ..................................................... 356/106,
 356/74
[51] Int. Cl. ....................................................... G01b 9/02
[50] Field of Search ........................................... 356/106,
 108, 111, 74-82

[56] References Cited
 UNITED STATES PATENTS
2,937,561  5/1960  Saunderson et al............  356/80
3,195,396  7/1965  Horwitz et al. ...............  356/106
 OTHER REFERENCES
 Jenkins, F. A. and White, H. E. "Fundamentals of Optics."
McGraw-Hill Book Co. Inc., N.Y. 1950 p. 327 relied upon.

Primary Examiner—Ronald L. Wibert
Assistant Examiner—T. Major
Attorney—Louis Etlinger ABSTRACT: A monochromaticity detector is disclosed herein which comprises means for producing the diffraction or interference pattern of light received from a remote source and a reticle/detector array of a predetermined pattern. The spatial intensity pattern produced at the detectors is periodic if the incident light is monochromatic and nonperiodic for broadband light. The detector output signals are electronically processed to provide a binary indication of whether the incident energy is sufficiently periodic and thus sufficiently monochromatic to have originated in a laser as well as an indication of selected characteristics of the energy.

INVENTOR.
JACOB SCHWARTZ
BY
AGENT

MONOCHROMATICITY DETECTOR

BACKGROUND OF THE INVENTION

1. Field of the Invention

The present invention relates generally to the field of electro-optics and more particularly to a method and apparatus for distinguishing monochromatic light from broadband light over a wide range of light frequencies.

2. Description of the Prior Art

Prior to the present invention if it became desirable particularly in a field environment, to detect and distinguish monochromatic light from broadband light it was necessary to employ a photodetector in combination with a narrow bandpass filter for each individual wavelength for which a detection capacity was desired. The obvious shortcomings of apparatus of this type lies in the fact that there is a response only to energy at preselected wavelengths corresponding to the filter passbands selected. Although such detectors may be thresholded at relatively high levels to thereby reduce the probability of responding to other than laser sources the detector still responds to any energy within the filter passband. Thus, even broadband energy may trigger a response in the prior art detectors whenever there is sufficient energy within the filter passband. It will further be obvious that raising the response threshold of the prior art-filtered detectors also reduces the probability of detecting relatively low level although monochromatic energy which may in fact have emanated from a remote laser source.

OBJECTS AND SUMMARY OF THE INVENTION

It is thus a primary object of the present invention to provide new and novel apparatus for distinguishing monochromatic from broadband light.

It is another object of the present invention to provide apparatus of the above-described character which is operable over a broad range of light wavelengths.

It is an additional object of the present invention to provide apparatus of the above described character which uses optical interference phenomena which creates distinctively different spatial intensity distributions for light of different bandwidths.

It is also an object of the present invention to provide apparatus of the above-described character having reticle-detector combinations which discriminate between types of intensity distributions.

It is a further object of the present invention to provide apparatus of the above-described character which produces a binary indication of the coherence of received radiant energy.

It is yet another object of the present invention to provide apparatus of the above-described character which indicates the relative amplitude of pulsed energy.

It is still an additional object of the present invention to provide apparatus of the above-described character which provides an indication of energy pulse duration.

These as well as other objectives of the present invention are achieved through the use of optical interference phenomena to produce a spatial intensity pattern that is periodic if the incident light is monochromatic and nonperiodic for broadband light. Pairs of detector elements are provided with reticle masks such that a difference between the output signals of each detector in each pair is only produced in response to a periodic intensity pattern. Varied reticle patterns are provided to ensure that any periodicity over a range of input wavelengths, angles of incidence and fortuitous phasing of intensity pattern with respect to the reticle masks will yield a conspicuous difference output from at least one detector pair. Suitable electronic logic circuitry is coupled to the detector outputs such as to provide a binary indication that energy received by the apparatus is monochromatic or polychromatic as well as provide analog information on the relative intensity and pulse characteristics, if any of the energy.

The foregoing as well as other objects, features and advantages of the present invention will become more apparent from the detailed description taken in conjunction with the appended drawings.

DESCRIPTION OF PREFERRED EMBODIMENT

Figure 1:
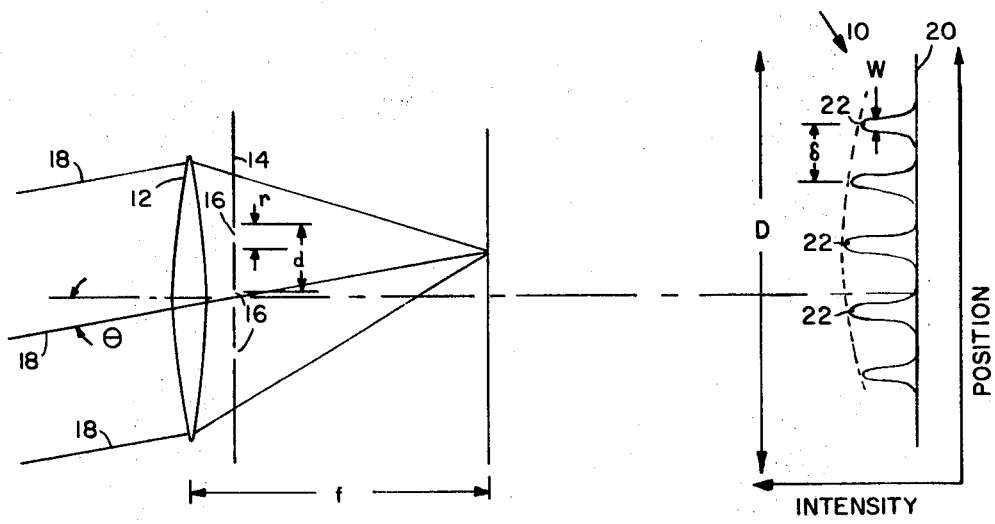
FIG. 1 is a schematic illustration of the spatial intensity pattern of incident light and means for producing the pattern.

Turning now to FIG. 1 there is schematically illustrated a typical spatial intensity pattern 10 for monochromatic light. One means of producing such a pattern is through the use of a lens 12 and a diffraction grating 14 with relatively coarse ruling and a small total of slits 16, The result is a diffraction pattern 10 showing many orders for a monochromatic light input represented by rays 18. The intensity pattern in the image plane 20 is quite periodic, having a period $\delta$ over a distance the order of $D$. The period, $\delta$, of the intensity pattern is given by the relationship.

$\delta = f\lambda/d$ where $f$ is the focal length of lens 12, $\lambda$ is the wavelength of the incident monochromatic light 18 and d is the center-to-center spacing of the slits 16 in the diffraction grating 14.

The width $D$ of the spatial intensity pattern is given by the relationship.

$D = (f\lambda)/r$ where $r$ is the width of the individual slits 16 in the diffraction grating 14.

The width, $w$, of the individual peaks 22 in the intensity pattern is inversely proportional to the total number of slits 16.

Figure 2:
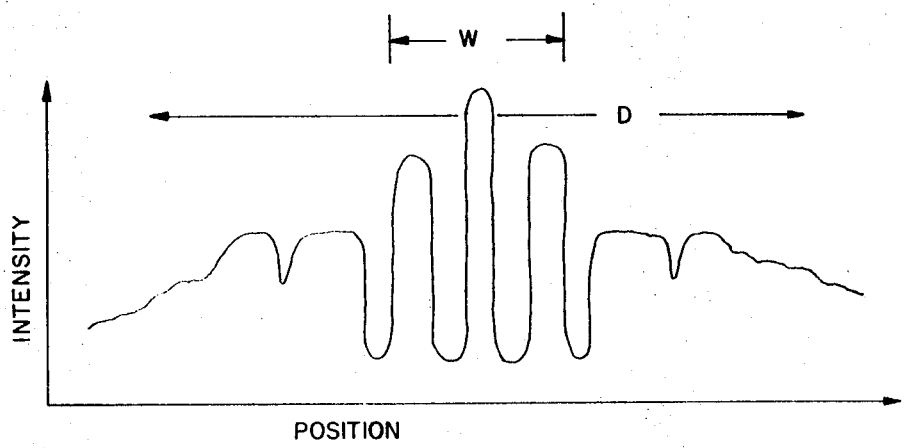
FIG. 2 is a graph of the spatial intensity pattern formed by a polychromatic point source of light.

FIG. 2 illustrates the spatial pattern which would result from polychromatic light incident upon the apparatus of FIG. 1. It will be noted that relative to the pattern from monochromatic light the polychromatic intensity pattern periodicity is poorly defined and is recognizable only over a relatively narrow width W. The width W of the distinguishable fringes may be compared in a manner which will be discussed hereinbelow with the overall width $D$ of the spatial intensity. Where W is of a value which is comparable to $D$ the spectral bandwidth of the incident energy is strongly coherent. A preselected value of W/D, herein termed the crossover bandwidth $\delta$ may thus be used as a criterion for a binary indication that the incident energy is relatively coherent or incoherent.

Other physical effects may also yield spatial intensity patterns the periodicity of which is dependent upon monochromaticity. For example, a Fabry-Perot interferometer of suitable reflectivity and order of interference can produce a fringe pattern comparable to that shown in FIG. 1 with a diffuse light source as well as a point source at infinity.

Figure 3:
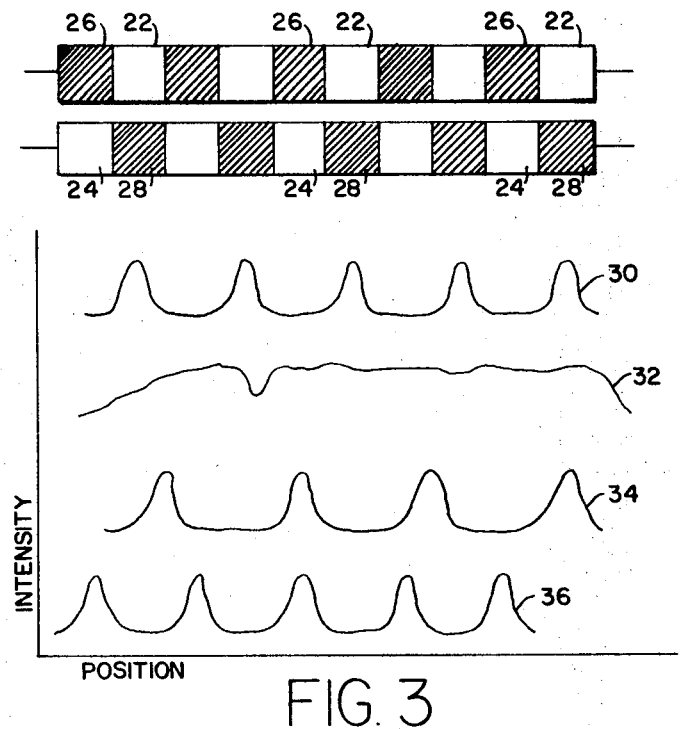
FIG. 3 is a schematic view of a detector pair with complementary reticle masks together with a variety of interference patterns.

FIG. 3 schematically illustrates a simplified detector which distinguishes a periodic from a nonperiodic spatial intensity pattern and illustrates the manner in which this distinction may be made. First and second photoelectric detector elements 22 and 24 respectively are disposed behind first and second complementary reticle masks 26 and 28. For a periodic intensity pattern such as that shown graphically by curve 30 it will be apparent that the difference between the outputs of detectors 22 and 24 will be of a significantly large value and the sum of these signals will be proportional to the total incident intensity. A nonperiodic spatial intensity pattern as illustrated by curve 32 tends to illuminate both detector elements 22 and 24 equally and will yield only a small difference between the output signals. Although the spatial intensity pattern shown as curves 34 and 36 are periodic they will still not produce a significant difference between the detector output signals since period of pattern 34 does not match the reticle period and pattern 36 is of a phase which is shifted with respect to the reticle masks such as to illuminate both detectors 22 and 24 approximately equally.

Figure 4:
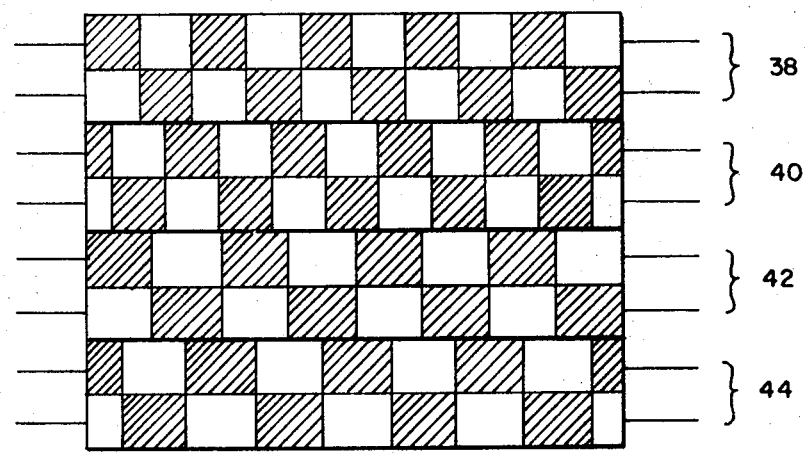
FIG. 4 is a schematic illustration of a multiperiodic detector reticle set.

FIG. 4 is a schematic illustration of a multiperiodic detector-reticle array of greater sophistication which safeguards against fortuitous mismatch of periodic patterns. In this illustration four pairs of elongate detectors 38, 40, 42 and 44 are provided, each pair having a complementary reticle mask of alternating opaque and transparent segments. The period of the mask associated with detector pair 40 is the same as that of pair 38 but with a phase which is shifted with respect to pair 38. In a similar manner detector pairs 42 and 44 are of a different period than pairs 38 and 40 and the phase of pair 44 is shifted with respect to pair 42. If the difference between the output signals of the detectors in any given pair is in excess of a threshold level it is a strong indication that monochromatic light is being received. If the difference between the detector output signals is small for all detector pairs in the array the incident light is of a spectral bandwidth which is probably too wide to have originated in a laser. It will be apparent that a multiperiodic detector-reticle array of the nature illustrated in FIG. 4 may be readily extended to accommodate any desired detection/discrimination probabilities with any desired crossover bandwidth.

Figure 5:
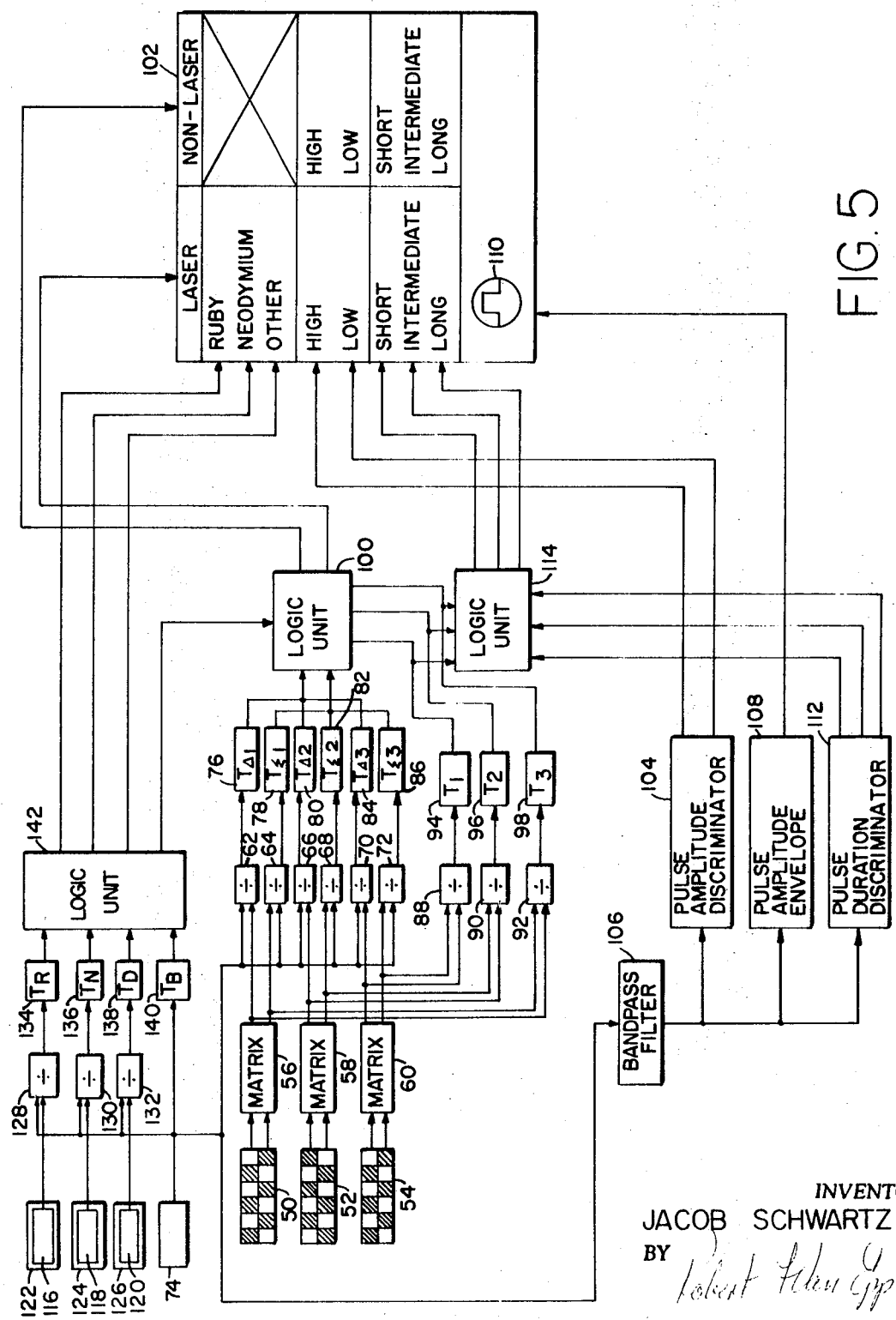
FIG. 5 is a schematic illustration of a monochromaticity detector system in accordance with the principles of the present invention.

FIG. 5 schematically illustrates one embodiment of a complete laser detector/discriminator system constructed in accordance with the principles of the present invention. A plurality of detector-reticle combinations 50, 52 and 54 of the type described with reference to FIGS. 3 and 4 are disposed such as to receive the spatial intensity pattern produced as shown in FIG. 1. Due to the considerable dynamic range of such a detector system it is generally inadvisable to apply threshold detectors directly to the outputs of detectors 50, 52 and 54. It is preferred to take ratios of the detector signals by coupling to sum and difference matrices 56, 58 and 60 respectively in order to obtain meaningful binary outputs. For example, let $a_1$ and $a_2$ represent the outputs of the first detector pair 50, $b_1$ and $b_2$ the outputs of the second pair 52 and $c_1$ and $c_2$ the outputs of the third pair 54. Thus $(a_1+a_2)$ is a signal which is indicative of the intensity incident upon detector pair 50 and $(a_1-a_2)$ if other than zero, tends to indicate a periodic spatial intensity pattern which matches the reticle mask covering detector pair 50. Due to the possibility that periodic intensity patterns of some phases and periods may yield a zero signal from some detector reticle pairs a reasonable array, preferably of the multiperiodic type illustrated in FIG. 4, should be used such that if any of the differences $(a_1-a_2)$, $(b_1-b_2)$, $(c_1-c_2)$, etc., is substantially other than zero, the incident radiation is producing a periodic spatial intensity pattern and thus is essentially monochromatic. The sum and difference signals from the matrices 56, 58 and 60 are each coupled to individual divider circuits 62 through 72. A photodetector 74 which is exposed to all incoming radiation may be employed to produce a signal representative of the total energy incident on the apparatus and such signal may be used as a ratio base signal to be applied to the dividers 62 through 72 in lieu of using the individual matrix output signals, $(a_1+a_2)$, $b_1+b_2)$, $(c_1+c_2)$, etc.

In Boolian logic the desired output of the dividers 62–72 is where $[(a_1-a_2)/B]+[(b_1-b_2)/B]+[(c_1-c_2)/B]+....=M$

[ ] is the binary value that approximates the bracketed quantity. When $M=1$ there is a strong indication that the incident light is monochromatic, and $M=0$ indicates the broadband light is being received.

The outputs of the dividers 62–72 will be approximately zero or one over a wide dynamic range of inputs. Thus threshold detectors 76 through 86 coupled to the dividers and set at about 0.5 can readily sort the divider outputs into meaningful binary categories.

In order to provide further system redundancy the sum and difference signals may also be applied to dividers 88, 90 and 92. The output signals from these dividers are of the type $[(a_1-a_2)/(a_1+a_2)]$---- where the bracketed value is approximated by the binary value and is applied to threshold detectors 94, 96 and 98 respectively.

The output signals from the difference threshold detectors 76, 80 and 84 are coupled together and applied to a logic unit 100 as a monochrome verification signal. The outputs of the sum threshold detectors 78, 82 and 86 are likewise coupled together and applied to the logic unit 100 as a signal verifying the fact that radiation is in fact being received.

The output signals from threshold detectors 94, 96 and 98 are binary indications of whether each of the detector pairs 50, 52 and 54 respectively are being illuminated by a periodic spatial intensity pattern. These signals are applied to logic unit 100.

If any of the inputs to logic unit 100 is 1 then detection of laser energy is indicated. If all these inputs are zero then a nonlaser is indicated providing the sum signal from at least one of the detectors 50–54 is much larger than the difference signal. Thus the output of logic unit 100 is a binary indication that radiation being received emanated from either a laser or a nonlaser and this output signal may be applied to any suitable display device 102.

In many application it is desired to determine the characteristics of remote pulsed layer sources. The present invention provides for this capability by applying the output of detector 74 to suitable analog signal processing circuitry. Detector 74 may be coupled to a pulse amplitude discriminator 104 through a bandpass filter 106 to reject other pulsed signals. The discriminator 104 may be for example a threshold detector to provide an indication of whether the amplitude of the received pulse is high or low with respect to a preselected level. The output of pulse amplitude discriminator 104 may thus be applied to display device 102 to indicate the receipt of high or low-intensity-pulsed radiation from either a monochromatic or polychromatic source.

A pulse amplitude envelope detector 108 may also be coupled to the bandpass filter 106 and operate to detect the shape of received pulses. The output of detector 108 may then be applied to any suitable display device such as an oscilloscope 110 to provide an indication of the received pulse shape.

The output of bandpass filter 106 may also be coupled to a pulse duration discriminator 112 which operates to sort received pulses into preselected pulse length categories. The outputs of discriminator 112 are coupled to logic unit 114 which also receives the outputs of threshold detectors 94, 96 and 98. The output of logic unit 114 thus is indicative of pulsed monochromatic or polychromatic energy of short, intermediate or long pulse width and may be applied to display device 102.

An additional capacity to provide information as to the type of laser which is illuminating the apparatus may be included if the application so requires. A plurality of photodetectors 116, 118 and 120 may be disposed behind suitable narrow band filter 122, 124 and 126 respectively. The spectral bandpass of each of the filters may be selected to include the wavelength of a particular type of laser; e.g., 0.69 microns for ruby, 1.06 microns for neodymium, etc. Again due to the dynamic range involved it is preferred to operate on the ratios of signals, thus the outputs of detectors 116, 118 and 120 are coupled to divider circuits 128, 130 and 132 respectively where they are divided by the ratio base signal from unfiltered detector 74. The outputs of the dividers 128, 130 and 132 will be approximately zero or 1 over a wide dynamic range of inputs and when coupled to threshold detectors 134, 136 and 138 again set at a preselected value can provide meaningful binary indications of whether radiation from a particular type of laser is being received. If desired the ratio base signal from unfiltered detector 74 may also be applied to a threshold detector 140 to provide a binary indication of whether the total received radiation is of sufficient intensity to have originated in a laser. The outputs of threshold detectors 134–140 are applied to a logic unit 142 the output from which is indicative of whether the received radiation corresponds to a given laser wavelength.

The logic unit 142 may be coupled to the display device 102 to indicate the type of laser illuminating the apparatus and also to logic unit 100 as a verification signal to aid in the determination of whether laser radiation is being received.

It will thus be apparent that the applicant has invented a new and novel laser detector/discriminator system whereby as little as a single pulse of radiation may be analyzed as to its monochromaticity, pulse characteristics and approximate wavelength.

It will thus be seen that the objectives set forth hereinabove, among those made apparent from the preceding discussion, are efficiently attained and, since certain changes may be made in the above construction without departing from the scope of the invention, it is intended that all matter contained in the above description or illustrated in the appended drawings shall be interpreted as illustrative and not in a limiting sense.

Having described what is new and novel and desired to secure by Letters Patent what is claimed is:

1. Apparatus for distinguishing monochromatic from broadband light energy comprising
   means for producing a spatial intensity pattern of said light energy in an image plane, said pattern being periodic for monochromatic light and nonperiodic for broadband light energy;
   first and second parallel elongate photoelectric detector elements disposed in said image plane, and responsive to said light energy to produce output signals proportional to the intensity of light energy incident thereupon;
   a complementary periodic reticle mask having first and second parallel linear arrays of alternating opaque and transparent segments, said arrays having a common spatial period and opposite spatial phase, said first array disposed on the light energy incident side of said first detector element and said second array disposed on the light energy incident side of said second detector element, whereby substantially more light energy in a periodic spatial intensity pattern is transmitted by the transparent segments of one said reticle mask array than is transmitted by the transparent segments of one said reticle mask array than is transmitted by the transparent segments of the other said reticle mask array, and light energy in a nonperiodic spatial intensity pattern is transmitted by the transparent segments of both said first and second arrays substantially equally; and
   signal-processing means including means coupled to said detector elements for producing signals representative of the sum and difference of said detector output signals, and means coupled to said sum and difference means for dividing said difference signal by said sum signal thereby producing a signal representative of the periodicity of said spatial intensity pattern, and thereby indicative of the monochromaticity of said light energy.

2. Apparatus as recited in claim 1 further including threshold detection means coupled to said dividing means and producing a binary indication as to the relative level of said divider output signal with respect to a preselected signal level.

3. Apparatus as recited in claim 1 further including an unmasked photoelectric detector element disposed such as to receive said light energy and responsive to produce an output signal representative of the total energy incident upon said apparatus.

4. Apparatus as recited in claim 3 wherein said signal-processing means includes means coupled to said detector elements for producing a signal representative of the sum of said detector output signals, and means coupled to said sum means and to said unmasked detector element for dividing said sum signal by the output signal from said unmasked detector element and thereby produce an output signal representative of the periodicity of said spatial intensity pattern.

5. Apparatus as recited in claim 4 further including threshold detection means coupled to said dividing means and producing a binary indication as to the relative level of said divider output signal with respect to a preselected signal level.

6. Apparatus as recited in claim 3 wherein said signal-processing means further includes
   means coupled to said unmasked detector element for sorting the output signal therefrom into one of a plurality of preselected total energy level categories.

7. Apparatus as recited in claim 6 wherein said sorting means comprises a bandpass filter coupled to an amplitude threshold detector.

8. Apparatus as recited in claim 6 further including means for indicating the total energy level category into which said incident energy is sorted.

9. Apparatus as recited in claim 3 wherein said signal processing means further includes
   means coupled to unmasked detector element for sorting the output signal therefrom into one of a plurality of preselected pulse duration categories.

10. Apparatus as recited in claim 9 further including means for indicating the pulse duration category into which said incident energy is sorted.

11. Apparatus as recited in claim 3 wherein said signal-processing means further includes
    a bandpass filter, and a pulse shape-detecting means, said detecting means coupled to said unmasked detector element through said bandpass filter and operative to produce an output signal representative of the shape of pulsed signals passed by said filter.

12. Apparatus as recited in claim 11 further including means for visually displaying the shape of pulsed light energy which is incident upon said apparatus.

13. Apparatus for distinguishing monochromatic from broadband light energy comprising
    means for producing a spatial intensity pattern of said light energy in an image plane, said pattern being periodic for monochromatic light energy, nonperiodic for broadband light energy, and having a period and phase which is dependent upon the wavelength of monochromatic light energy;
    a plurality of pairs of photoelectric detector elements disposed in said image plane, each said pair comprising first and second parallel elongate detector elements responsive to said light energy to produce output signals proportional to the intensity of light energy incident thereupon;
    a complementary periodic reticle mask disposed on the light energy incident side of each of said plurality of pairs of detector elements, each said reticle mask having first and second parallel linear arrays of alternating opaque and transparent segments, the arrays of each said reticle mask having a common spatial period and opposite spatial phase, said first array disposed on the light energy incident side of a first detector element of each said pair and said second array disposed on the light energy incident side of a second detector element of each said pair;
    each of said reticle masks having a combination of spatial period and phase which is different from the spatial period and phase of reticle masks disposed on others of said plurality of detector element pairs such that the transparent segments of one array of at least one said reticle mask transmit substantially more light energy in a periodic spatial intensity pattern than is transmitted by the transparent segments of the other said reticle mask array whereby one detector element in at least one of said plurality of pairs is illuminated with substantially more energy than the other detector element of said pair, and
    signal-processing means including means coupled to each detector element for producing signals representative of the sums and differences of the output signals of each pair of detector elements, and means coupled to each said sum and difference means for dividing the difference signal from each detector pair by the sum signal from each detector pair thereby producing signals representative of the periodicity of said spatial intensity pattern for each pair of detector elements, and thereby indicative of the monochromaticity of said light energy.

14. Apparatus as recited in claim 13 further including threshold detection means coupled to each said dividing means and producing a binary indication as to the relative level of each said dividing means output signal with respect to a preselected signal level.

15. Apparatus as recited in claim 14 further including indicating means coupled to all said threshold-detecting means which indicates the incidence of monochromatic light energy upon said apparatus when the output signal from any one dividing means exceeds said preselected signal level.

PO-1050
(5/69)

UNITED STATES PATENT OFFICE
CERTIFICATE OF CORRECTION

Patent No. 3,612,691                                  Dated October 12, 1971

Inventor(s) Jacob Schwartz

It is certified that error appears in the above-identified patent and that said Letters Patent are hereby corrected as shown below:

| | |
|---|---|
| Column 2, line 24 | The word --number-- should be inserted after the word "total". |
| Column 3, line 37 | The word --them-- should be inserted after the word "coupling". |
| Column 4, line 24 | the word "layer" should read --laser--. |
| Column 4, line 55 | The word "filter" should read --filters--. |
| Column 5, lines 40, & 41 | the phrase "one said reticle mask than is transmitted by the transparent segments of" should be deleted. |
| Column 6, line 18 | The word --said-- should be inserted after the word "to". |

Signed and sealed this 2nd day of May 1972.

(SEAL)
Attest:

EDWARD M. FLETCHER, JR.
Attesting Officer

ROBERT GOTTSCHALK
Commissioner of Patents